July 3, 1934. W. K. SKOLFIELD 1,965,359
PIVOT BEARING
Filed July 11, 1933

Inventor:
William K. Skolfield,
by Harry E. Dunham
His Attorney.

UNITED STATES PATENT OFFICE 1,965,359

PIVOT BEARING

William K. Skolfield, Bridgeport, Conn., assignor to General Electric Company, a corporation of New York Application July 11, 1933, Serial No. 679,876

3 Claims. (Cl. 248—15)

The present invention relates to pivot bearings and especially to pivot bearings for a part which moves relatively slowly.

One application of my invention, and an application to which it is especially well adapted, is in pivot bearings for oscillating electric fans, and it is this application of my invention which I have chosen to illustrate and describe herein. It is to be understood, however, that this is only by way of example and that the invention is not limited necessarily thereto.

For a consideration of what I believe to be novel and my invention, attention is directed to the accompanying description and the claims appended thereto.

Figure 1:
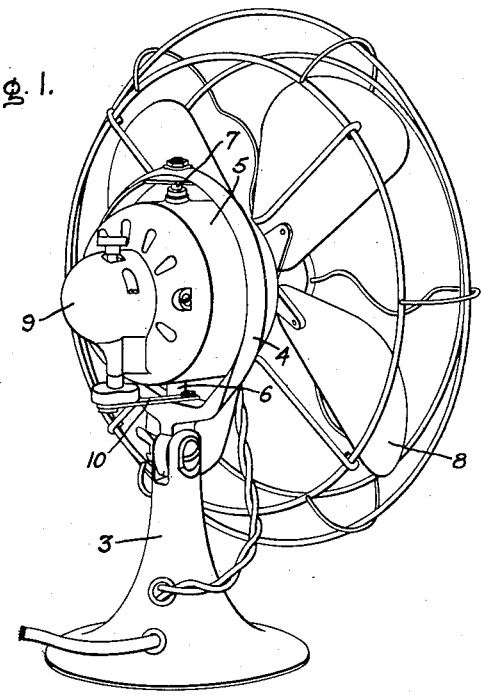
Figure 2:
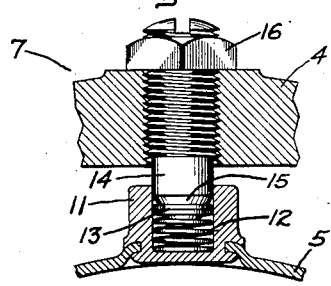

In the drawing, Fig. 1 is a perspective view of an oscillating electric fan provided with a pivot bearing embodying my invention, and Fig. 2 is a sectional view through the pivot bearing.

Referring to the drawing, Fig. 1 shows an electric fan comprising a base 3, a trunnion or circular frame 4 supported on base 3, and an electric motor 5 mounted in lower and upper pivot bearings 6 and 7 in frame 4. On the armature shaft of the motor are fan blades 8. A gearing housed in a casing 9 at the rear of the motor and driven from the motor shaft is connected by a link 10 to trunnion 4 and effects oscillation of the motor in its bearings 6 and 7 when the fan is in operation. The structure so far described is a known one in oscillating electric fans and requires no further description. The arrangement shown is to be taken as typical of any suitable oscillating fan structure.

My invention relates particularly to the construction of the upper bearing 7, as shown in section in Fig. 2.

In connection with an oscillating electric fan, it is important that the motor be held firmly and without play in the bearings in which it oscillates in order to avoid rattling between the parts. At the same time, however, the bearings must not be so tight as to interfere with the free oscillating movement of the motor. Also, the bearings must be simple in structure so they may be manufactured at low cost and they must be easy to adjust and capable of maintaining correct adjusted positions. The lower bearings, of course, present no difficulties since the weight of the motor serves always to maintain the pivot firmly on the bearing seat. With the upper bearing, however, the case is different since it must be adjusted to an exact position if satisfactory operation is to be obtained. Prior to my invention, difficulties were experienced in providing an upper bearing of simple structure which could be readily adjusted and which would maintain this adjustment, and more particularly the object of my present invention is to provide an improved upper bearing structure overcoming the difficulties previously met with.

Referring particularly to Fig. 2, my improved bearing structure comprises a socket or cup 11 carried by the top of the motor casing and in which is located a bearing member comprising a coiled spring 12 having an upper turn or two or more upper turns 13 wound close together to provide a bearing seat for the pivot. The upper turn or turns are so wound that the end turn is square or substantially square with the axis of the spring. Spring 12 may be made of suitable steel spring wire and its turns are of an outside diameter slightly less than the inside diameter of socket or cup 11. Carried by frame 4 is an adjustable pivot pin 14 having a cone shaped end 15 which engages the upper turn or turns 13 of coiled spring bearing member 12. Pivot pin 14 is preferably constructed from hardened steel so as to have good wearing qualities. Pivot pin 14 is preferably threaded to engage a threaded opening in trunnion 4 so that it may be adjusted readily by screwing it down and back. On its outer end, it is provided preferably with a lock nut 16. Spring wire 12 is of a diameter such that the upper turn or turns 13 which form the seat for cone shaped end 15 extend part way up along the side of the cone but do not extend close to the upper end thereof. This is important as it assures space for taking up wear on the cone shaped end.

In assembling the construction, spring 12 is dropped into the socket or cup 11 and, since the outside diameter of its turns are slightly less than the inside diameter of the socket, it fits loosely in the socket. The pivot pin 14 is then inserted and screwed down into engagement with the turns 13 of the spring. As it engages the turns of the spring, it compresses the spring somewhat and at the same time expands it radially so as to bring the turns of the spring against the sides of socket 11. The spring thus becomes firmly positioned in the socket so that it cannot rattle or vibrate. At the same time, the upward pressure of the spring serves to seat the turn or turns 13 firmly against the cone shaped end 15 of pivot pin 14. The pivot pin 14 is screwed down to put the spring 12 under a suitable amount of compression so that it serves to provide a firm upper bearing seat for the pin. Exact positioning of the pivot pin is not required since the spring will take care of a reasonable amount of variation in the positioning of the pin. When the pivot pin is positioned, the cone shaped end 15 seats firmly against the upper end of the spring and can turn thereon. No side play can occur since the outer surface of the spring engages firmly the inner wall of socket 11 As a result, there is provided a pivot bearing structure which, without nice adjustment, will be tight and which cannot rattle. Also, any wear which takes place between the cone shaped end 15 and turn or turns 13 is taken up automatically by the spring.

What I claim as new and desire to secure by Letters Patent of the United States, is:

1. The combination of a support, a member pivotally mounted at its lower end on said support and a pivot bearing for the upper end of the member comprising an open ended socket on the member, a coiled spring in the socket having one or more turns which form a bearing seat, a stationary member, and an adjustable pivot pin carried by the stationary member having a conical end which engages the bearing seat.

2. A pivot bearing comprising a socket, a coiled spring in the socket having one or more turns which form a bearing seat, the outside diameter of the turns of the spring being less than the diameter of the socket, and a pivot pin having a conical end engaging said bearing seat, said pin serving to place the spring under compression and expand it against the wall of the socket.

3. For an electric fan comprising a motor and a trunnion in which it is pivotally mounted, an upper pivot bearing comprising a socket connected to the motor casing, a coiled spring in the socket having one or more turns which form a bearing seat, and a pivot pin adjustably mounted in the frame and having a conical end which engages said bearing seat and holds the spring under compression.

WILLIAM K. SKOLFIELD.